(12) United States Patent
Oami

(10) Patent No.: US 12,175,846 B2
(45) Date of Patent: Dec. 24, 2024

(54) MONITORING DEVICE, SUSPICIOUS OBJECT DETECTING METHOD, AND RECORDING MEDIUM

(71) Applicant: NEC Corporation, Tokyo (JP)

(72) Inventor: Ryoma Oami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/235,741

(22) Filed: Aug. 18, 2023

(65) Prior Publication Data

US 2023/0394939 A1 Dec. 7, 2023

Related U.S. Application Data

(63) Continuation of application No. 17/436,741, filed as application No. PCT/JP2020/006589 on Feb. 19, 2020.

(30) Foreign Application Priority Data

Mar. 27, 2019 (JP) .................................. 2019-061223

(51) Int. Cl.
*G06T 7/70* (2017.01)
*G06V 20/52* (2022.01)
(Continued)

(52) U.S. Cl.
CPC .......... *G08B 13/19613* (2013.01); *G06T 7/70* (2017.01); *G06V 20/52* (2022.01);
(Continued)

(58) Field of Classification Search
CPC ................ G08B 13/19613; G06T 7/70; G06T 2207/30201; G06T 2207/30232;
(Continued)

(56) References Cited

U.S. PATENT DOCUMENTS 11,151,481 B1 * 10/2021 Sun ...................... G06V 40/161
2005/0104960 A1 * 5/2005 Han ...................... G06V 20/52
382/103
(Continued)

FOREIGN PATENT DOCUMENTS

JP 2011-107765 A 6/2011
JP 2014-016968 A 1/2014
(Continued)

OTHER PUBLICATIONS

Tarushikha et al. ("Suspicious object detection." 2016 2nd International Conference on Advances in Computing, Communication, & Automation (ICACCA)(Fall). IEEE (Year: 2016).*
(Continued)

*Primary Examiner* — Fabio S Lima

(57) ABSTRACT

A monitoring device and the like are provided which are capable of detecting an attribute change in a suspicious object that cannot be determined from the behavior of the object. An associating unit associates, among a plurality of objects detected from time-series image data, identical objects with one another. An attribute change detecting unit detects from the time-series image data a change in an attribute of at least one of the identical objects and an attendant item. A suspicious object detecting unit detects a suspicious object on the basis of the change in attribute.

18 Claims, 11 Drawing Sheets

(51) Int. Cl.
*G06V 40/16* (2022.01)
*G06V 40/18* (2022.01)
*G06V 40/20* (2022.01)
*G08B 13/196* (2006.01)

(52) U.S. Cl.
CPC .......... *G06V 40/172* (2022.01); *G06V 40/197* (2022.01); *G06V 40/25* (2022.01); *G06T 2207/30201* (2013.01); *G06T 2207/30232* (2013.01)

(58) Field of Classification Search
CPC .... G06V 20/52; G06V 40/172; G06V 40/197; G06V 40/25
See application file for complete search history.

(56) References Cited

U.S. PATENT DOCUMENTS

| | | | |
|---|---|---|---|
| 2008/0143532 A1* | 6/2008 | Murrah .............. | G06K 19/0717 340/572.4 |
| 2014/0016831 A1 | 1/2014 | Yokoi et al. | |
| 2014/0211988 A1* | 7/2014 | Fan ........................ | G06V 20/52 382/103 |
| 2015/0269745 A1* | 9/2015 | Klimer ................... | G06T 7/262 382/103 |
| 2017/0220871 A1* | 8/2017 | Ikeda .................... | H04N 23/69 |
| 2017/0351906 A1 | 12/2017 | Oguchi et al. | |
| 2018/0040178 A1 | 2/2018 | Nagata et al. | |
| 2019/0191098 A1 | 6/2019 | Ishii et al. | |
| 2019/0245851 A1* | 8/2019 | Whaley .................. | G06V 40/25 |
| 2020/0151441 A1* | 5/2020 | Doumbouya .......... | G06V 40/10 |
| 2020/0193146 A1 | 6/2020 | Pu et al. | |
| 2020/0265627 A1 | 8/2020 | Seo et al. | |

FOREIGN PATENT DOCUMENTS

| | | |
|---|---|---|
| JP | 2016-057908 A | 4/2016 |
| JP | 2016-127563 A | 7/2016 |
| JP | 2018-042270 A | 3/2018 |
| JP | 2019-016098 A | 1/2019 |
| WO | 2019/042195 A1 | 3/2019 |

OTHER PUBLICATIONS

US Office Action for U.S. Appl. No. 17/436,741, mailed on Feb. 15, 2024.
Tarushikha Joshi et al., "Suspicious object detection", 2016 2nd International Conference on Advances in Computing, Communication, & Automation (ICACCA)(Fall), IEEE (Year: 2016).
International Search Report for PCT Application No. PCT/JP2020/006589, mailed on May 26, 2020.
English translation of Written opinion for PCT Application No. PCT/JP2020/006589, mailed on May 26, 2020.
US Office Action for U.S. Appl. No. 17/436,741, mailed on Oct. 25, 2023.
US Office Action for U.S. Appl. No. 18/235,749, mailed on May 22, 2024.

* cited by examiner

Fig.8

| No. | SPECIFIC ATTRIBUTE CHANGE | SPECIFIC CONTEXT (ENVIRONMENT, EVENT) |
|---|---|---|
| 1 | CHANGE IN CLOTHING | LOCKER ROOM |
| 2 | CHANGE IN LUGGAGE | LOADING AND CHANGE IN WAY OF CARRYING LUGGAGE |
| 3 | CHANGE IN CLOTHING | MOVEMENT OF PERSON FROM OUTSIDE TO ROOM |
| ... | ... | ... |

EXCEPTION INFORMATION

MONITORING DEVICE, SUSPICIOUS OBJECT DETECTING METHOD, AND RECORDING MEDIUM

This application is a Continuation of U.S. application Ser. No. 17/436,741 filed on Sep. 7, 2021, which is a National Stage Entry of PCT/JP2020/006589 filed on Feb. 19, 2020, which claims priority from Japanese Patent Application 2019-061223 filed on Mar. 27, 2019, the contents of all of which are incorporated herein by reference, in their entirety.

TECHNICAL FIELD

The disclosure relates to a monitoring device, a suspicious object detecting method, and a recording medium, and particularly to a monitoring device that detects a suspicious object.

BACKGROUND ART

A related technique, for detecting a suspicious object based on the behavior of an object detected from time-series images, exists. PTL 1 describes that the behavior of a person appearing in a monitoring video is detected, and the detected behavior of the person is matched with a pattern of suspicious behavior. A "degree of suspicion" (level of suspicion) is associated with each pattern of suspicious behavior. The technique described in PTL 1 outputs an alarm when the "degree of suspicion" of a person exceeds a threshold.

PTLs 2, 3, and 4 describe a technique for tracking a person by matching a feature of a specified person with the feature of a person detected from time-series images using at least one of a feature of the person's face and a feature of the person's appearance, and using the matching result.

Specifically, PTLs 2 and 3 describe a technique for tracking a person by newly adding a feature of clothing when the clothing is changed while tracking the person. Meanwhile, PTL 4 describes a technique for tracking a person to detect a shoplifting action. Here, it is described that a change such as bulging of a pocket of the clothing or fast walking after shoplifting is detected to determine whether the person to be tracked is suspicious.

CITATION LIST

Patent Literature

[PTL 1] JP 2011-107765 A
[PTL 2] JP 2014-16968 A
[PTL 3] JP 2016-127563 A
[PTL 4] JP 2016-057908 A

SUMMARY OF INVENTION

Technical Problem

In the related technique described in PTL 1, for example, it is not possible to detect that a human (object) has disguised himself/herself or has left a carried object in a place not shown in a monitoring video.

In the techniques described in PTLs 2 and 3, since the clothing change itself is not determined to be suspicious, it is not possible to extract a person who has changed his/her clothing as a suspicious person and output an alert. The technique described in PTL 4 detects only the change of clothing or gait of a person within the range of sameness assumed for a specific action such as shoplifting. For this reason, it is not possible to detect the switching of clothing or gait of the person itself and output an alert for a suspicious person.

The disclosure has been made in view of the above problems, and a main object thereof is to provide a monitoring device and the like capable of detecting a suspicious object that cannot be determined from the behavior of the object.

Solution to Problem

A monitoring device according to an aspect of the disclosure includes: association unit that associates the same object among multiple objects detected from time-series image data; attribute change detection unit that detects an attribute change of at least one of the same object and an accessory of the object from the time-series image data; and a suspicious object detection unit that detects a suspicious object based on the attribute change.

A suspicious object detecting method according to an aspect of the disclosure includes: associating the same object among multiple objects detected from time-series image data; detecting an attribute change of at least one of the same object and an accessory of the object from the time-series image data; and detecting a suspicious object based on the attribute change.

A recording medium according to an aspect of the disclosure records a program for causing a computer to execute processing of: associating the same object among multiple objects detected from time-series image data; detecting an attribute change of at least one of the same object and an accessory of the object from the time-series image data; and detecting a suspicious object based on the attribute change.

Advantageous Effect of Invention

According to one aspect of the disclosure, it is possible to detect a suspicious object that cannot be determined from the behavior of the object.

BRIEF DESCRIPTION OF DRAWINGS

FIG. 8 is a table illustrating an example of exception information.

EXAMPLE EMBODIMENT

Example Embodiment 1

Example embodiment 1 will be described with reference to FIGS. 1 and 2.

(Monitoring Device 100)

Figure 1:
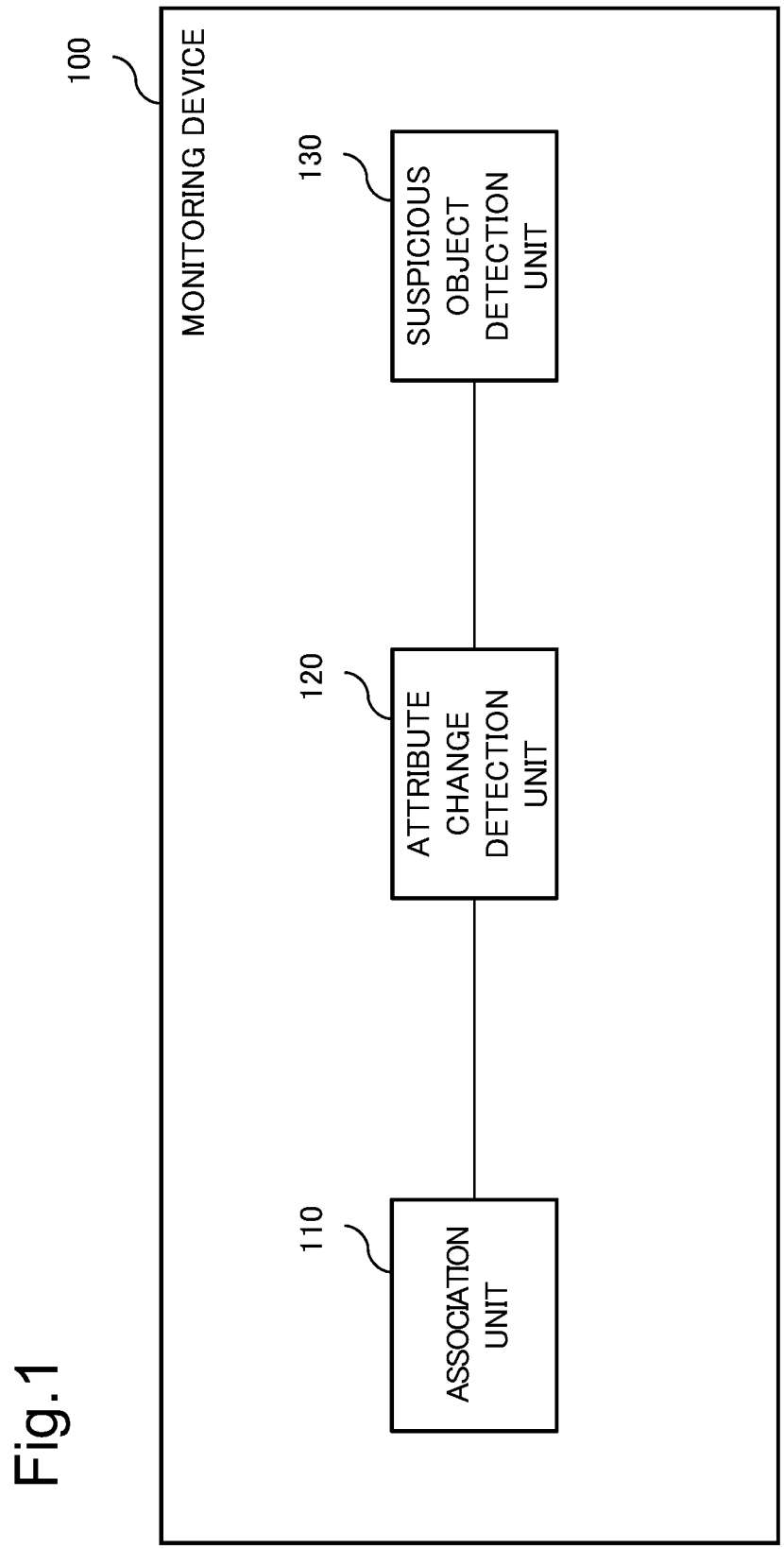
FIG. 1 is a block diagram illustrating a configuration of a monitoring device according to Example embodiment 1.

FIG. 1 is a block diagram illustrating a configuration of a monitoring device 100 according to Example embodiment 1. As illustrated in FIG. 1, the monitoring device 100 includes an association unit 110, an attribute change detection unit 120, and a suspicious object detection unit 130.

(Association Unit 110)

The association unit 110 associates the same objects with each other among multiple objects detected from time-series image data. The association unit 110 is an example of association means. For example, the association unit 110 associates identification information (e.g., label added to each object) of the same objects and stores them in a memory (not illustrated).

An object is a body to be monitored in image data. For example, an object is a moving object (person, vehicle, or the like) or an installed object. Attribute information of an object is information regarding the attribute of the object. The attribute of an object is a feature unique to the object and forms the modality of the object. The modality refers to an aspect, an atmosphere, or a way sensed by the five human senses. A unique feature referred to herein only needs to be unique within the observation target period, and does not need to be semi-permanently unique.

In particular, when the object is a person, the attribute of the object is one or more features that form the apparent personality of the person, and specifically includes at least one of the face, iris, gait, body shape, and hairstyle of the person.

Features of accessories of an object are also included in the attribute of the object. An accessory is another object attached to a certain object. For example, when the object is a person, the accessory is a bag, a suitcase, baggage, clothing, footwear, an accessory (e.g., mask, eyeglass, hat, or the like), or other belongings. Further, an accessory also includes a portion of the person integrated with the accessory, such as the face or hairstyle of the person. Further, the attribute of the accessory itself may also be a part of the attribute of the object. The attribute of the accessory includes at least one of color, size, shape, pattern, number, position, and texture of the accessory.

Some accessories, such as clothing, are detected without being distinguished from the object, and other accessories, such as belongings, are detected while being distinguished from the object. Alternatively, an accessory closely attached to the object, such as a backpack carried on the back by a person (example of object), may be detected together with the object (i.e., integrally). Here, regardless of whether the object and the accessory are inseparably detected, the feature of the accessory is treated as a part of the attribute of the object.

In the case of an accessory detected separately from the object, a body that is in the vicinity of the object (e.g., within predetermined range from position of object) and moves along with the object is detected as an accessory of the object.

The association unit 110 associates the same objects with each other among the multiple objects detected from the time-series image data, on the basis of at least one of attribute information and position information of the objects. Hereinafter, first to third examples of association of the same object by the association unit 110 will be described.

In a first example, the association unit 110 associates the same objects with each other among the multiple objects, on the basis of position information of the objects. Position information of an object includes position coordinates of a region of the object in each piece of image data. For example, an object can be tracked by associating the same object using position information of the object detected from time-series image data. A method of tracking an object is described in PTLs 2 to 4, for example.

The position coordinates may be position coordinates on an image, or may be a real-world coordinate system obtained by converting the position coordinates on an image by a camera parameter representing the position and pose of a camera. The camera parameter can be calculated by performing calibration in advance. When tracking an object, the association unit 110 may use information regarding the similarity in the appearance of the object in addition to the attribute of the object. For example, the association unit 110 may also use the similarity in the visual features (color, pattern, shape, and the like) of the image in the region of the object, the similarity in the motion, and the like for tracking the object.

In a second example, the association unit 110 associates the same objects with each other among the multiple objects, on the basis of the attribute information of the objects. In this case, the association unit 110 determines the sameness of the object by using the attribute information of the object, and further outputs the sameness determination result of the object. For example, the association unit 110 calculates a score based on the similarity or distance between pieces of attribute information of persons as a scale for determining the sameness of an object.

In particular, when the object is a person, the association unit 110 may associate the same person by identifying the person by face matching, iris matching, or matching using other biometric information among multiple persons detected in the time-series image data. The sameness determination of the person may be performed by identification means (not illustrated). In this case, the association unit 110 associates the same person on the basis of the result of the sameness determination of the person by the identification means.

When the attribute information includes multiple elements, the association unit 110 may associate the same object by using multiple pieces of attribute information in combination. In this case, the association unit 110 weights the object sameness determination results that are based on the multiple pieces of attribute information, according to the accuracy of the object sameness determination made based on each attribute information. For example, the association unit 110 adds a coefficient between 0 and 1 for a likelihood (e.g., 30% chance of being object A and 70% chance of being object B) indicating the sameness determination result of the object.

The association unit 110 integrates the weighted sameness determination results. One method of weighting is to determine the weight on the basis of the accuracy of the object sameness determination made based on each attribute information. For example, the object sameness determination test made based on each attribute information is repeated, and the accuracy of the object sameness determination made based on the attribute information is determined according to the number or the ratio of correctly determined times. The association unit 110 weights the object sameness determination results that are based on the individual attribute information, and then adds the results. Note, however, that the integration method is not limited to this. Alternatively, the association unit 110 can use any method in order to integrate the sameness determination results for the multiple attributes. The association unit 110 associates the same object on the basis of the integrated sameness determination result.

In a third example, the association unit 110 determines the sameness of an object and associates the same object by using both attribute information and position information of the object. In this case, the association unit 110 weights each of the object sameness determination result of that is based on the attribute information and the object sameness determination result that is based on the position information. Then, the association unit 110 associates the same object on the basis of a result of integrating the two weighted sameness determination results. Alternatively, as described above, the association unit 110 may integrate the two sameness determination results by another method.

The attribute information is not necessarily extracted from every piece of image data. When attribute information cannot be extracted from image data, as described in the first example, the association unit 110 determines the sameness of the object by tracking based on the position information. In this manner, the criterion of the sameness determination may vary among time-series images. As a result, the reliability of the sameness determination also varies. Hence, the association unit 110 may include, in the association information, information indicating the reliability of the sameness determination for each image.

The reliability of the association also depends on whether other objects exist around the object and whether attributes of the objects are similar to each other. Hence, the association unit 110 may obtain the reliability in consideration of the distribution status of other surrounding objects.

The association unit 110 associates the same object among the objects detected from the time-series image data by any of the methods described above. That is, when the score indicating the sameness between objects is equal to or more than a certain value, the association unit 110 determines that the objects are the same and associates the objects with each other. Then, the association unit 110 groups the associated same objects. Attribute information of the associated same objects is also grouped.

As described above, since the attribute information cannot always be extracted, the attribute information is sometimes extracted intermittently in time series. That is, a situation occurs in which only a part of the attribute information is extracted at a certain time, and the rest of the attribute information is also extracted at another time. The association unit 110 associates the attribute information extracted in this way, too, with the group determined to be the same object.

The association unit 110 transmits sameness determination information of the associated objects to the attribute change detection unit 120. The object sameness determination information includes information for distinguishing a group of objects determined to be the same by the association unit 110 and attribute information of the objects associated with the group. The information for distinguishing a group of objects determined to be the same by the association unit 110 is also referred to as a group ID (identification). Further, the object sameness determination information may also include position information of the objects.

As illustrated in the following cases 1, 2, and 3, the association unit 110 may indirectly associate the same person (example of object) among objects detected from time-series image data, by also using information such as a distribution status of other surrounding objects and constraints in the environment. In these cases, the association unit 110 associates the same person using at least one of the attribute information of the object and the position information of the object and also using information regarding the environment or the like.

Case 1: No other person exists around the detected person.
Case 2: All other persons are identified, and only one unidentified person exists.
Case 3: In a situation where the room has one doorway and there was no other person in the room, one person enters and then leaves the room.

(Attribute Change Detection Unit 120)

The attribute change detection unit 120 detects a change in the attribute of at least one of the same object and accessory from the time-series image data. That is, the attribute change detection unit 120 detects, among the objects determined to be the same, an object in which some attributes (including attribute of accessory) do not indicate sameness. The attribute change detection unit 120 is an example of attribute change detection means.

Specifically, the attribute change detection unit 120 receives the object sameness determination information from the association unit 110. The attribute change detection unit 120 groups the same objects in the time-series image data by using the object sameness determination information and further checks consistency of attributes of the same objects.

More specifically, the attribute change detection unit 120 detects a change in the attribute by calculating the similarity between attributes of the same objects specified in the time-series image data. Hereinafter, a change in the attribute of an object or an accessory may be simply referred to as an attribute change.

For example, the attribute change detection unit 120 detects, as an attribute change, a change in at least one of the color, size, shape, pattern, number, position, and texture of the accessory of the same object between pieces of time-series image data. Note, however, that the attribute change described here is an example. The attribute change detection unit 120 may detect any attribute change of an object or an accessory.

For example, when the object is a person and a person determined to be the same from the gait information and position information puts on a 3D mask at some point so that the person's face changes, this may also be detected as an attribute change by the attribute change detection unit 120. Similarly, when a person changes his/her clothing so that the attribute of the clothing changes to the sameness state, this may also be detected as an attribute change by the attribute change detection unit 120.

Specifically, the attribute change detection unit 120 detects, as an attribute change, the fact that the similarity between attributes of objects determined to be the same associated in time series falls below a certain threshold (value lower than threshold used in sameness determination). Note, however, that the similarity between the attributes may temporarily decrease due to factors such as an environmental change. For this reason, after the similarity between the attributes falls below a certain threshold, the attribute change detection unit 120 may detect the attribute change after confirming that the attribute after the change of the object is stable. That is, the attribute change detection unit 120 may detect the attribute change when a state in which the similarity of the changed attribute is equal to or more than a certain threshold continues for a certain period or longer.

When an attribute change is detected, the attribute change detection unit 120 transmits an attribute change detection result to the suspicious object detection unit 130. An attribute change detection result includes a group ID of a group that identifies the object, the type of the changed attribute, and information indicating the content of the attribute change.

(Suspicious Object Detection Unit 130)

The suspicious object detection unit 130 detects a suspicious object on the basis of a change in attribute. The suspicious object detection unit 130 is an example of suspicious object detection means.

Specifically, the suspicious object detection unit 130 receives an attribute change detection result of the same object from the attribute change detection unit 120.

The suspicious object detection unit 130 detects the object in which the attribute change is detected as a suspicious object.

The suspicious object detection unit 130 may give notice that a suspicious object has been detected. For example, the suspicious object detection unit 130 may output an alert or may notify a terminal possessed by a security guard.

In one modification, the suspicious object detection unit 130 may calculate the "degree of suspicion" that is a numerical value representing the degree (level) of suspicion of the object by matching the detected attribute change of the object with a predetermined attribute change pattern. For example, when the attribute of only the face or clothing is changed, the suspicious object detection unit 130 may increase the value of the degree of suspicion. Then, the "degree of suspicion" may be accumulated in time series, and when the accumulated value exceeds a threshold, the suspicious object detection unit 130 may output an alert.

(Operation Flow of Monitoring Device 100)

An operation flow of the monitoring device 100 according to Example embodiment 1 will be described with reference to FIG. 2. FIG. 2 is a flowchart illustrating an operation flow of the monitoring device 100.

Figure 2:
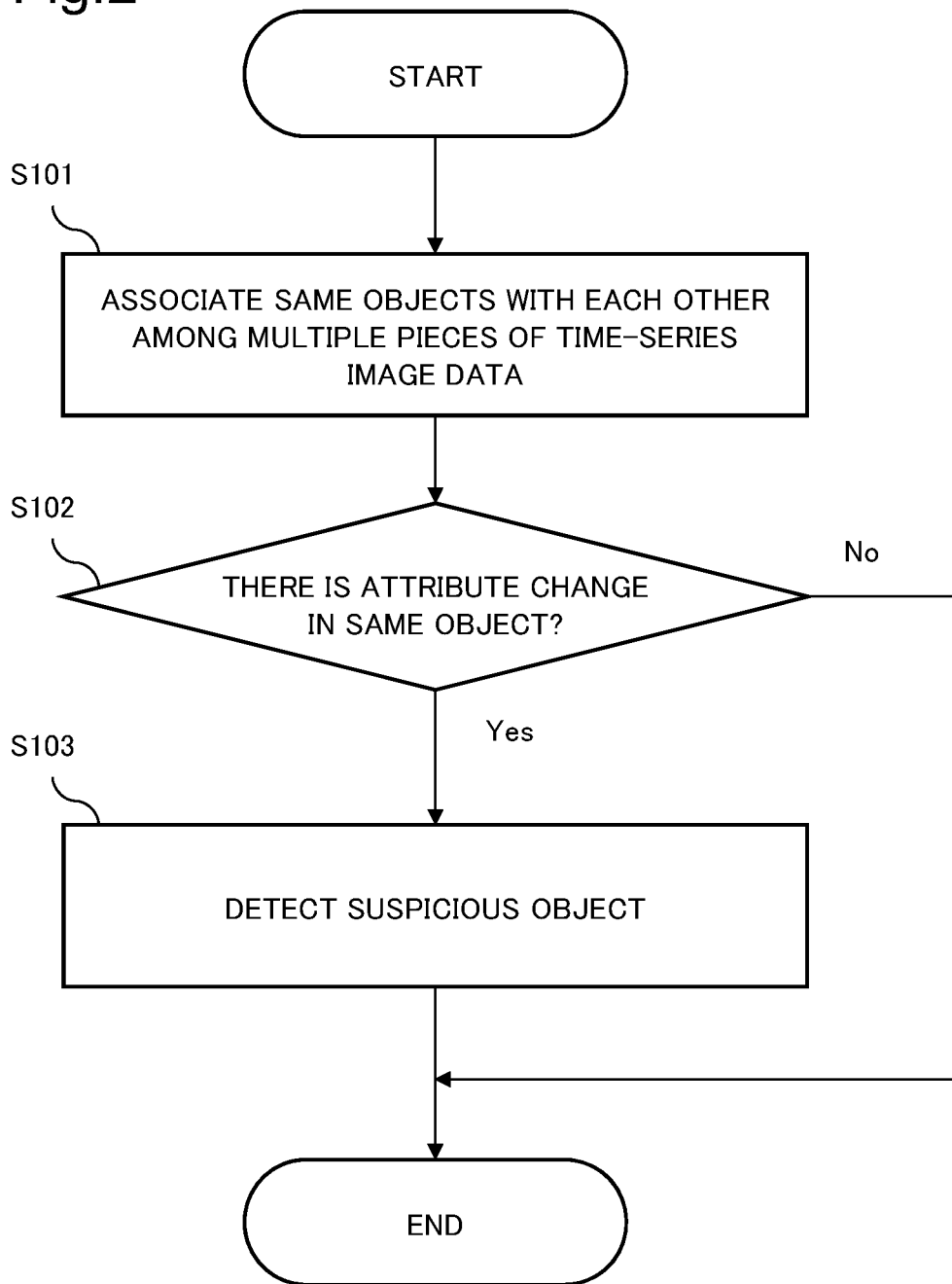
FIG. 2 is a flowchart illustrating an operation flow of the monitoring device according to Example embodiment 1.

As illustrated in FIG. 2, the association unit 110 associates the same objects with each other among multiple objects detected from time-series image data (S101).

The association unit 110 transmits sameness determination information including a result of association between the same objects to the attribute change detection unit 120.

The attribute change detection unit 120 detects an attribute change of the same object between pieces of time-series image data using the sameness determination information of the object. The attribute change detection unit 120 transmits the attribute change detection result of the same object to the suspicious object detection unit 130.

If the attribute change detection unit 120 does not detect an attribute change of the same object between pieces of time-series image data (No in S102), the flow illustrated in FIG. 2 ends.

On the other hand, if the attribute change detection unit 120 detects an attribute change of the same object between pieces of time-series image data (Yes in S102), the suspicious object detection unit 130 detects an object whose attribute has changed as a suspicious object (S103).

Thus, the operation flow of the monitoring device 100 according to Example embodiment 1 ends.

Effects of Present Example Embodiment

According to the configuration of Example embodiment 1, the association unit 110 associates the same objects with each other among multiple objects detected from time-series image data. The attribute change detection unit 120 detects a change in the attribute of at least one of the same object and accessory from the time-series image data. The suspicious object detection unit 130 detects a suspicious object on the basis of a change in attribute. Hence, the monitoring device 100 according to Example embodiment 1 can detect a suspicious object that cannot be determined from the behavior of the object.

Example Embodiment 2

In Example embodiment 2, a configuration in which the same object is associated and an attribute change is further detected using attribute data stored in an attribute data storage unit will be described.

(Monitoring Device 200)

Figure 3:
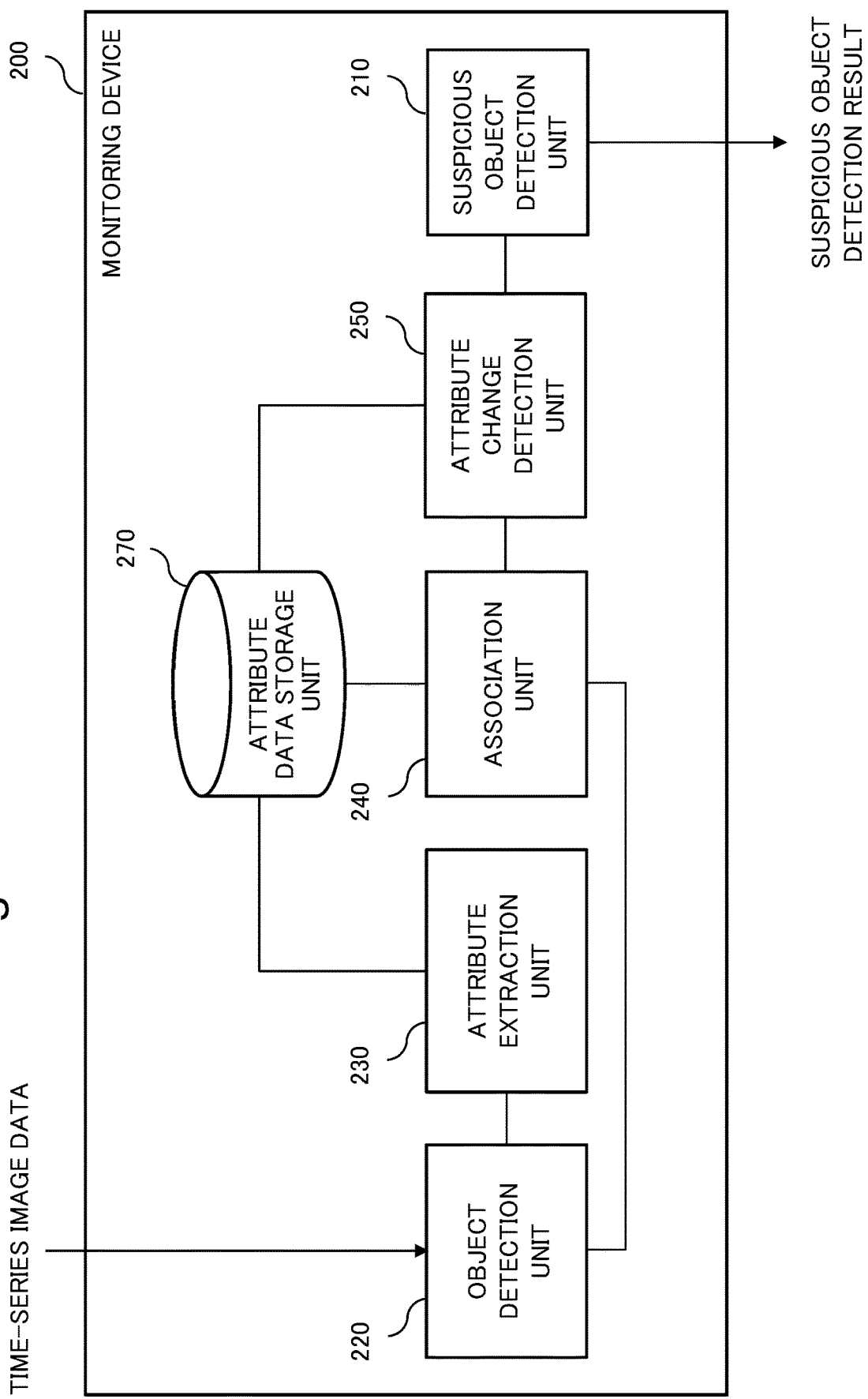
FIG. 3 is a block diagram illustrating a configuration of a monitoring device according to Example embodiment 2.

FIG. 3 is a block diagram illustrating a configuration of a monitoring device 200 according to Example embodiment 2. As illustrated in FIG. 3, the monitoring device 200 includes a suspicious object detection unit 210, an object detection unit 220, an attribute extraction unit 230, an association unit 240, an attribute change detection unit 250, and an attribute data storage unit 270. In the following description, a case where the object is a person will be mainly described, but the object does not necessarily need to be a person. For example, the monitoring device 200 may be a system that monitors a vehicle, and the object may be a vehicle.

(Object Detection Unit 220)

The object detection unit 220 acquires time-series image data. For example, the object detection unit 220 acquires moving image data captured by one or multiple monitoring cameras (not illustrated) from the monitoring cameras as time-series image data.

The object detection unit 220 detects multiple objects from the received time-series image data. In Example embodiment 2, the object detection unit 220 uses a discriminator having learned features of an object to be detected, such as a person or an accessory, to detect the object from each piece of image data and extracts a region of the object.

The object detection unit 220 adds a label (hereinafter referred to as person label) to each person detected from each piece of image data. Then, the object detection unit 220 transmits the image data of the region of the person extracted from each image data to the attribute extraction unit 230 together with the person label.

The object detection unit 220 detects an accessory of the object. For example, the object detection unit 220 detects an object that is in close contact with a person and has a large degree of overlap with the region of the person as an accessory. The object detection unit 220 adds a label (hereinafter referred to as accessory label) to each detected accessory, and associates the accessory label with the above-described person label.

Alternatively, the object detection unit 220 may detect an object that is separated from a person but is in the vicinity of the person as an accessory, and the person and the accessory may be associated with each other. At this time, the object detection unit 220 may also consider the positional relationship between the person and the accessory. Alternatively, when only one person is near an object other than a person, the object detection unit 220 may associate the object with the person as an accessory.

Alternatively, the object detection unit 220 may associate a person with an accessory in consideration of reliability indicating the certainty of association. For example, when there are multiple persons near an object, the object detection unit 220 associates each person with the accessory, and obtains the reliability of the association. Note, however, that when there are multiple persons near the accessory, the reliability of association between each person and the accessory is lower than when only one person exists near the accessory. The person and the accessory may be associated not by the object detection unit 220 but by the attribute extraction unit 230 described later.

The object detection unit 220 transmits position information of a person or an accessory including position coordinates (e.g., position coordinates of four corners of a region of a person or an accessory) of a person or an accessory detected from each piece of image data to the association unit 240 together with a person or accessory label.

(Attribute Extraction Unit 230)

The attribute extraction unit 230 receives the image data of the region of the person and the person label, and the image data of the region of the accessory and the label of the accessory from the object detection unit 220. The attribute extraction unit 230 extracts the attribute information of the person from the image data of the region of the person. For example, the attribute extraction unit 230 extracts information regarding the face, iris, gait, and hairstyle of the person from the image data of the region of the person as the attribute information of the person.

The attribute extraction unit 230 further extracts attribute information indicating the attribute of the accessory from the image data of the region of the accessory. The attribute extraction unit 230 stores attribute data in which the extracted attribute information of the person and attribute information of the accessory are associated with a person label received from the object detection unit 220 in the attribute data storage unit 270.

(Association Unit 240)

The association unit 240 associates the same persons with each other among multiple persons detected from time-series image data. The association unit 240 is an example of association means.

Specifically, the association unit 240 receives, from the object detection unit 220, the position information of the person indicating the position coordinates of the region of the person in the image data and the person label of the person.

The association unit 240 refers to the attribute data storage unit 270 and acquires attribute data related to the person label received from the object detection unit 220. Attribute data associates attribute information of a person and attribute information of an accessory with a person label.

Then, the association unit 240 associates the same objects with each other among multiple objects detected from time-series image data, on the basis of at least one of attribute information and position information of the objects.

In one example, the association unit 240 associates the same persons with each other among multiple persons detected from time-series image data, on the basis of position information of the person received from the object detection unit 220. Specifically, the association unit 240 tracks a person using position information of the person. The association unit 240 associates the same persons with each other among persons detected from time-series image data by determining the sameness of the person detected from the time-series image data on the basis of the tracking result of the person (including trajectory of person).

Alternatively, the association unit 240 may associate the same persons with each other among multiple persons detected from time-series image data, on the basis of attribute information of the person included in attribute data. Specifically, the association unit 240 determines the sameness of the person by performing face matching or iris matching using the feature of the face or iris pattern of the person as the attribute information of the person. The association unit 240 associates the same person among all persons detected from the time-series image data on the basis of the sameness determination result of the person.

The association unit 240 may associate persons by using only one piece of attribute information (e.g., facial feature, pattern of iris, and the like of person).

Alternatively, when the attribute information of the person includes multiple elements (e.g., face, iris, gait, body shape, and hairstyle), the association unit 240 may associate persons using all or some of the multiple elements of the attribute information. In this case, the association unit 240 weights the person sameness determination results that are based on the multiple elements of the attribute information. Then, the association unit 240 associates the same person by integrating the weighted person sameness determination results.

Alternatively, the association unit 240 may associate the same persons with each other among multiple persons detected from time-series image data on the basis of both attribute information and position information of the object. For example, the association unit 240 associates the same person by weighting and integrating the person sameness determination result based on the position information of the person and the person sameness determination result obtained based on the attribute information of the person.

More generally, the association unit 240 obtains a likelihood representing the likelihood of being the same person for each attribute on the basis of each piece of attribute information. The association unit 240 integrates the obtained likelihoods of attributes. Then, the association unit 240 determines that multiple persons are the same person when the integrated likelihood exceeds a certain threshold. Alternatively, the association unit 240 may learn a function for obtaining an integrated likelihood using multiple pieces of attribute information as inputs, by using a neural network or the like. In this case, the association unit 240 can directly obtain the integrated likelihood from the multiple pieces of attribute information using the function obtained by learning. When the attribute extraction unit 230 cannot extract some of the attribute information of the person, the association unit 240 determines the sameness of the person using only the extracted attribute information.

The association unit 240 may also obtain the reliability of the sameness determination. The reliability of the sameness determination depends on the attribute information of the person used by the association unit 240 and the distribution situation of other persons around the person.

Alternatively, the association unit 240 may indirectly associate the same person by using distribution information of other persons, environment constraint information, and the like. One example is the case described in Example embodiment 1 above in which all persons except only one person are identified among multiple persons detected by the object detection unit 220. In such a case, the association unit 240 associates the remaining person as the same person without identifying the one person.

The association unit 240 associates the same person among persons detected from time-series image data by any of the methods described above. The association unit 240 transmits information (e.g., group ID) indicating a group of person labels related to the same person to the attribute change detection unit 250.

For example, it is assumed that a person a and a person b detected from different pieces of image data are the same. In this case, the association unit 240 puts the person label added to the person a and the person label added to the person b in a group of same persons. Then, the association unit 240 assigns the same group ID to multiple person labels forming the group of same persons, and transmits the group ID to the attribute change detection unit 250 as information indicating the group of same persons.

(Attribute Change Detection Unit 250)

The attribute change detection unit 250 receives, from the association unit 240, information indicating the group of same persons as a result of the association of persons by the association unit 240.

The attribute change detection unit 250 detects an attribute change of the same object (person in this example) between pieces of time-series image data, on the basis of the result of the association of persons by the association unit 240.

Specifically, the attribute change detection unit 250 acquires multiple pieces of attribute data related to multiple person labels associated with one group ID from the attribute data storage unit 270, using the information indicating the group of same persons. As described above, attribute data of a person includes attribute information of the person and attribute information of the accessory.

The attribute change detection unit 250 determines whether the attributes of the same persons match. That is, the attribute change detection unit 250 determines whether the attribute of a person associated with each person label and the attribute of a person associated with another person label match. For example, multiple person labels related to the same persons (i.e., multiple person labels associated with one group ID) are defined as person label $L_1$, person label $L_2$, ..., person label $L_n$. The attribute change detection unit 250 determines whether the attribute of a person associated with the person label $L_1$ and the attribute of a person associated with a person label $L_k$ (k=2, 3, ..., n) match.

When the attributes of the same persons or the attributes of the accessories of the same person do not match, the attribute change detection unit 250 determines that the attribute of at least one of the person and the accessory has changed between the pieces of time-series image data. Hereinafter, a change in the attribute of a person or the attribute of an accessory of a person is referred to as an attribute change of the person or simply an attribute change.

Note, however, that as described in Example embodiment 1 above, the similarity between the attributes of the same persons may temporarily decrease due to factors such as an environmental change. For this reason, after the similarity between the attributes of the same persons decreases, the attribute change detection unit 250 may detect an attribute change after confirming that the value of the attribute of the person is stable.

The attribute extraction unit 230 cannot always extract all the attribute information of a person from image data. For this reason, the attribute change detection unit 250 detects an attribute change only on the basis of attribute information that can be extracted by the attribute extraction unit 230. When the same person has multiple attributes, the attribute change detection unit 250 detects a change in at least one attribute among the multiple attributes as an attribute change. Alternatively, the attribute extraction unit 230 may detect a change, disappearance, or appearance of a specific accessory of a person as an attribute change. For example, the attribute change detection unit 250 may detect, as an attribute change, that the presence of an accessory is no longer detected from a certain point of time, or conversely, that an accessory is detected from a certain point of time.

The attribute change detection unit 250 transmits the attribute change detection result to the suspicious object detection unit 210. The attribute change detection result includes the type of the changed attribute, the content of the attribute change (e.g., change in color, number, size, shape, pattern, texture, number, position, or the like of accessory), and the sameness determination information of the person whose attribute has changed. The sameness determination information may also include reliability information indicating the certainty of the sameness.

(Suspicious Object Detection Unit 210)

The suspicious object detection unit 210 detects a suspicious object on the basis of the attribute change detection result. The suspicious object detection unit 210 is an example of suspicious object detection means.

Specifically, the suspicious object detection unit 210 receives an attribute change detection result from the attribute change detection unit 250. The suspicious object detection unit 210 detects a person whose attribute has changed as a suspicious object. For example, in a case where the attribute of an accessory possessed, accompanied, carried, held, worn, pushed, or pulled by a person changes, the suspicious object detection unit 210 detects the person as a suspicious object. For example, the suspicious object detection unit 210 detects a person whose facial feature has changed as a suspicious object.

The suspicious object detection unit 210 may give notice that a suspicious object has been detected. For example, the suspicious object detection unit 210 may output an alert or may notify a terminal possessed by the security guard. The suspicious object detection unit 210 may output the content (e.g., change in color of accessory such as clothing) of the detected attribute change and image data of the person whose attribute has changed to a display device (not illustrated).

Similarly to the suspicious object detection unit 130 according to Example embodiment 1 above, the suspicious object detection unit 210 may calculate the "degree of suspicion" that is a numerical value representing the degree (level) of suspicion of the object by matching the detected attribute change of the object with a predetermined attribute change pattern. Then, the suspicious object detection unit 210 may accumulate the "degree of suspicion" in time series and output an alert when the accumulated value exceeds a threshold.

(Operation Flow of Monitoring Device 200)

Figure 4:
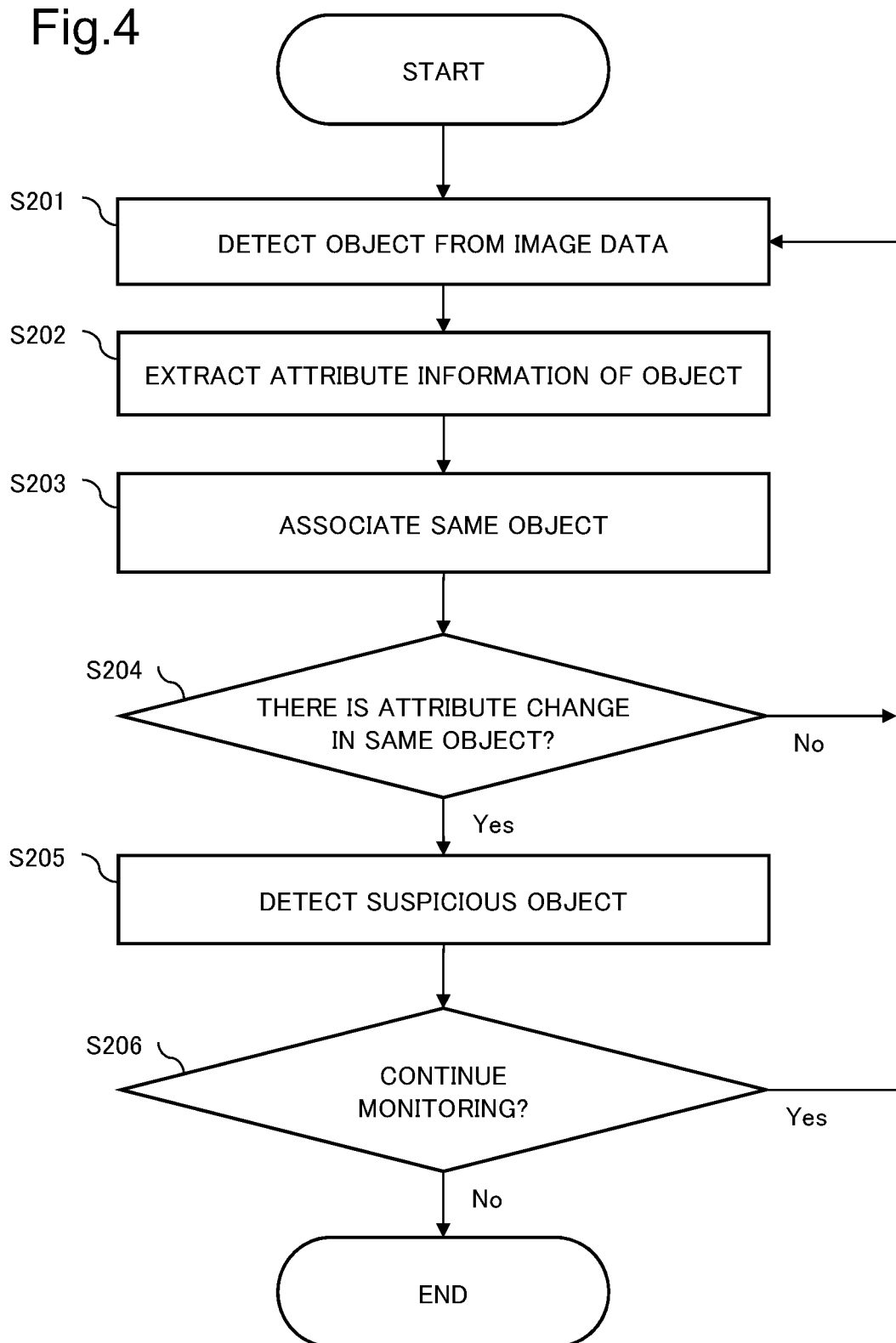
FIG. 4 is a flowchart illustrating an operation flow of the monitoring device according to Example embodiment 2.

An operation flow of the monitoring device 200 according to Example embodiment 2 will be described with reference to FIG. 4. FIG. 4 is a flowchart illustrating an operation flow of the monitoring device 200.

As illustrated in FIG. 4, the object detection unit 220 acquires time-series image data.

In Example embodiment 2, the object detection unit 220 receives image frames (hereinafter referred to as image data) of moving image data captured by the monitoring camera one by one in real time. The object detection unit 220 detects one or multiple objects (person or accessory in this example) from the received single piece of image data (S201).

The object detection unit 220 transmits image data of a region of each person and accessory in the image data to the attribute extraction unit 230 together with identification information (hereinafter referred to as person label and accessory label) of each person and accessory. The object detection unit 220 transmits position information of each person to the association unit 240 together with the person label assigned to each person.

The attribute extraction unit 230 receives the image data of the region of the person and the accessory together with the person label and the accessory label from the object detection unit 220. The attribute extraction unit 230 extracts attribute information of the person and attribute information of the accessory of the person from the image data of the region of the person and the accessory (S202).

The attribute extraction unit 230 stores the extracted attribute information of the person and the accessory in the attribute data storage unit 270 as attribute data in association with the person label received from the object detection unit 220. Hereinafter, when simply described as attribute information of a person, attribute information of the accessory is also included.

The association unit 240 receives position information of the person together with the person label from the object detection unit 220.

The association unit 240 associates the same person on the basis of at least one of the attribute information and the position information of the person (S203).

The association unit 240 transmits information (i.e., group ID) indicating a group of multiple person labels related to the same person to the attribute change detection unit 250.

The attribute change detection unit 250 receives the group ID indicating a group of multiple person labels related to the same person from the association unit 240. The attribute change detection unit 250 acquires multiple pieces of attribute data related to the same person from the attribute data storage unit 270 using the multiple person labels related to the same person.

Then, the attribute change detection unit 250 determines whether the attribute of the same person changes using the multiple pieces of attribute data acquired from the attribute data storage unit 270 (S204). For example, the association unit 240 can use the similarity or the distance between the attributes of the same person as a scale for determination in step S204.

If the attribute of the same person has not changed (No in S204), the operation flow returns to step S201.

On the other hand, if the attribute of the same person has changed (Yes in S204), the suspicious object detection unit 210 detects the person whose attribute has changed as a suspicious object (S205).

If the monitoring of the object (person) by the monitoring device 200 is continued (Yes in S206), the operation flow returns to step S201. If the monitoring of the object (person) by the monitoring device 200 is not continued (No in S206), the operation flow ends. The monitoring device 200 may be controlled to continue monitoring only in a certain time zone by a timer, for example.

Effects of Present Example Embodiment

According to the configuration of the present example embodiment, the association unit 240 associates the same objects with each other among multiple objects detected from time-series image data. The attribute change detection unit 250 detects a change the attribute of at least one of the same object and accessory from the time-series image data. The suspicious object detection unit 210 detects a suspicious object on the basis of a change in attribute. Hence, it is possible to detect a suspicious object that cannot be determined from the behavior of the object.

Example Embodiment 3

In Example embodiment 3, a configuration for verifying the authenticity of a detected attribute change will be described. In Example embodiment 3, a true attribute change means an actual attribute change. A false attribute change means an attribute change that is erroneously detected even though it has not actually occurred. In the following description, a case where the object is a person will be mainly described, but the object may be an object other than a person such as a vehicle.

(Monitoring Device 300)

Figure 5:
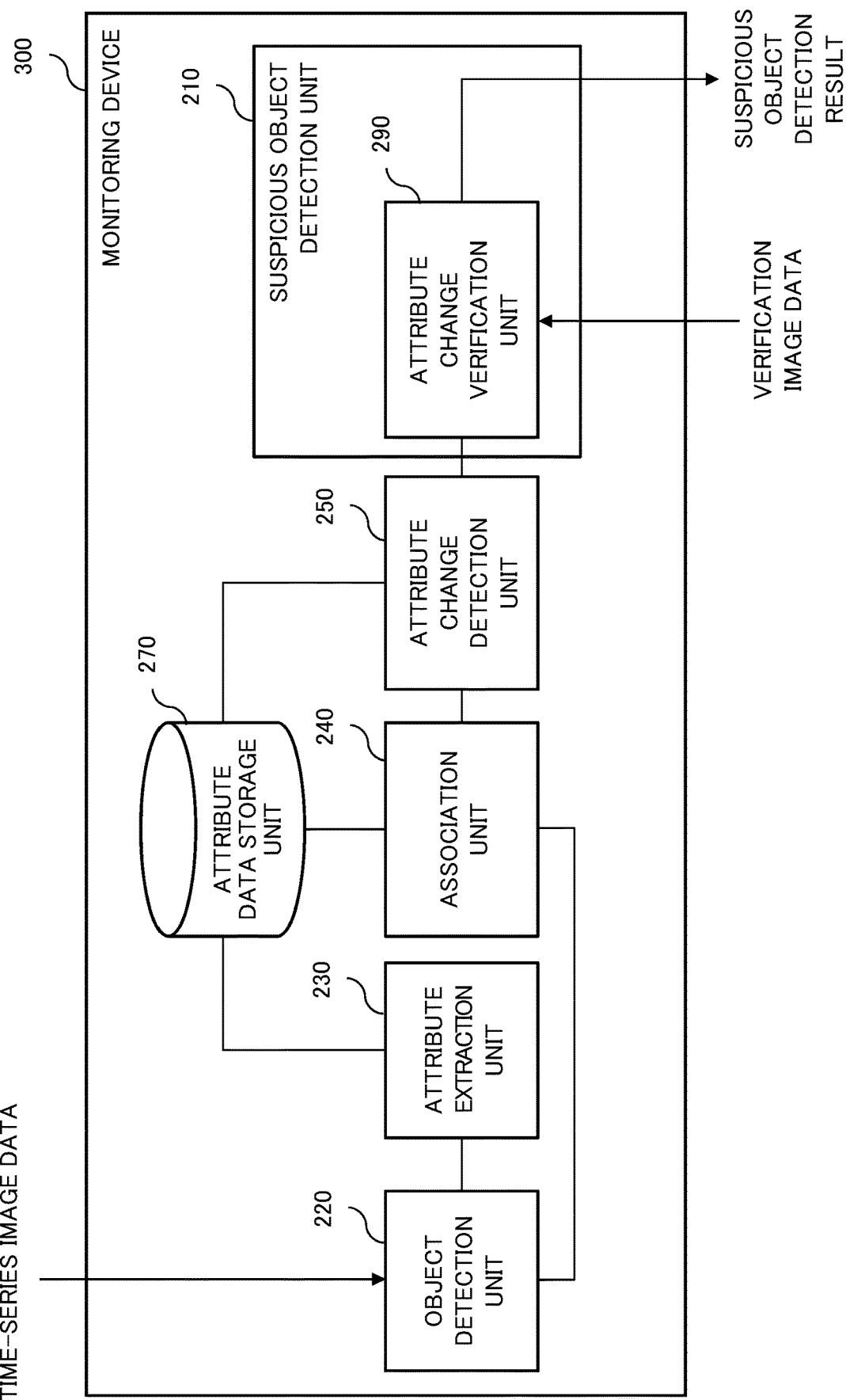
FIG. 5 is a block diagram illustrating a configuration of a monitoring device according to Example embodiment 3.

FIG. 5 is a block diagram illustrating a configuration of a monitoring device 300 according to Example embodiment 3. As illustrated in FIG. 5, the monitoring device 300 includes a suspicious object detection unit 210, an object detection unit 220, an attribute extraction unit 230, an association unit 240, an attribute change detection unit 250, and an attribute data storage unit 270. Additionally, in the monitoring device 300, the suspicious object detection unit 210 includes an attribute change verification unit 290.

The configuration of the monitoring device 300 according to Example embodiment 3 is obtained by adding the attribute change verification unit 290 to the configuration of the monitoring device 200 according to Example embodiment 2 above. In Example embodiment 3, only the attribute change verification unit 290 will be described below.

(Attribute Change Verification Unit 290)

The attribute change verification unit 290 verifies the authenticity of an attribute change of an object (person in this example) detected by the attribute change detection unit 250. The attribute change verification unit 290 is an example of attribute change verification means.

Specifically, the attribute change verification unit 290 receives, from the attribute change detection unit 250, an attribute change detection result and information (e.g., frame number of image data) for specifying the image data in which the attribute change is detected.

The attribute change verification unit 290 specifies the image data in which the attribute change is detected among pieces of time-series image data by using the information (e.g., frame number of image data) for specifying the image data in which the attribute change is detected.

The attribute change verification unit 290 acquires, from the time-series image data, one or multiple pieces of image data (hereinafter referred to as verification image data) corresponding to image data in which the attribute change is detected and image frames within a predetermined time range before and after the image data.

The attribute change verification unit 290 verifies the authenticity of the attribute change detected by the attribute change detection unit 250 using the acquired verification image data.

Here, there are several reasons why a false attribute change is detected. One example is that the association unit 240 has failed in associating the same person. In particular, in a case where a large number of persons are present at the same time (i.e., in the same image data), in a case where the attribute extraction unit 230 cannot accurately extract the attributes of the person and the accessory, or in a case where the association unit 240 performs the sameness determination only on the basis of the position information of the person, the association unit 240 is likely to fail to correctly associate the same person. The attribute extraction unit 230 may fail to extract correct attribute information of a person or an accessory due to the influence of another person, such as the person being shielded by another person. As described above, the attribute change detection unit 250 may erroneously detect an attribute change due to erroneous association of the same person by the association unit 240 or extraction of the attribute information of an erroneous person or accessory by the attribute extraction unit 230. These are false attribute changes.

When the attribute change is false, the attribute change verification unit 290 removes (hereinafter sometimes referred to as filtering or filtering out) the attribute change detection result by the attribute change detection unit 250.

Hence, the suspicious object detection unit 210 detects a person as a suspicious object when the change in the attribute of the person is true, and does not detect a person as a suspicious object when the change in the attribute of the person is false. The determination of true or false does not necessarily need to be a binary decision, and the suspicious object detection unit 210 may calculate an index indicating the degree of trueness. Then, when the calculated value of the index exceeds a threshold designated by the user, the suspicious object detection unit 210 may consider that the detected attribute change is true and detect the person as a suspicious object.

(Example of False Attribute Change)

In any of the following cases, the attribute change verification unit 290 determines that the detected attribute change is false. Note, however, that the cases described below are merely examples.

(Case 1) Failure in Detection of Person and Resulting Failure in Extraction of Attribute Information When a person is hidden by a product shelf (container), another person, or the like, the object detection unit 220 may not be able to accurately extract the region of the person from image data. In this case, the region of the person extracted by the object detection unit 220 may include a background or a region of another object. For this reason, the attribute extraction unit 230 cannot correctly extract attribute information of the person from the region of the person extracted by the object detection unit 220.

In this case, the attribute change verification unit 290 separates the verification image data into the region of the person (foreground) and the background by the background subtraction method, for example, and distinguishes the person from the other regions. Note, however, that in order to use the background subtraction method, time-series image data needs to be captured by a fixed camera.

The attribute change verification unit 290 compares the background region (region determined not to be person) in the verification image data with the region of the person detected by the object detection unit 220. Then, when reliability of the attribute extracted from the region of the person or the region of the accessory is low because a part of the detected region of the person is shielded by a background region such as a shelf, the attribute change verification unit 290 determines that the detected attribute change is false.

Alternatively, the attribute change verification unit 290 verifies overlap between a person and another person in verification image data. When the overlap between the person and the another person is large, a possibility that the person is shielded is high. In that case, the attribute change verification unit 290 determines that the detected attribute change is false. Here, the attribute change verification unit 290 preferably checks whether the another person overlapping the person exists, including not only the image data related to the image frame in which the person is detected but also the image frame temporally close to the image frame. As a result, even when the another person is not detected in the image data related to the image frame in which the person is detected, the attribute change verification unit 290 may be able to detect the another person from the image frame temporally close to the image frame.

(Case 2) Change in Posture of Person

When a person tilts his/her head, crouches, or leans forward, the attribute information (e.g., face and gait of person) of the person apparently changes on the image data. In this case, the association unit 240 may fail to associate the same person or may fail to extract the attribute of a person.

The attribute change verification unit 290 detects a change in the posture of a person by analyzing verification image data. When a change in the posture of a person is detected from verification image data, even if an attribute change is detected, the attribute change verification unit 290 determines that the attribute change is false for the attribute affected by the posture change.

(Case 3) Variation of Illumination

When the brightness or color of the illumination changes, the attributes of an accessory such as the color of the person's clothing apparently change. In this case, the attribute change detection unit 250 may erroneously detect an attribute change.

The attribute change verification unit 290 detects a change in at least one of brightness and color of the background (or specific region) from the verification image data. Then, in a case where at least one of the brightness and the color of the background (or specific region) in the verification image data has changed, the attribute change verification unit 290 determines that the illumination has changed. When the attribute change detection unit 250 detects an attribute change affected by a variation (e.g., brightness) of the illumination, the attribute change verification unit 290 determines that the detected attribute change is false.

Alternatively, the attribute change verification unit 290 may also consider the reliability of association of the same person by the association unit 240. For example, in image frames temporally before and after the image frame in which the attribute change is detected, the attribute change verification unit 290 checks the reliability of association of the same person by the association unit 240. When the reliability of association of the same person by the association unit 240 is low, the attribute change verification unit 290 may determine that the detected attribute change is a false attribute change. When calculating the reliability of association between a person and an accessory, the object detection unit 220 (or attribute extraction unit 230) may also consider this reliability to determine the authenticity of the attribute change.

(Operation Flow of Monitoring Device 300)

Figure 6:
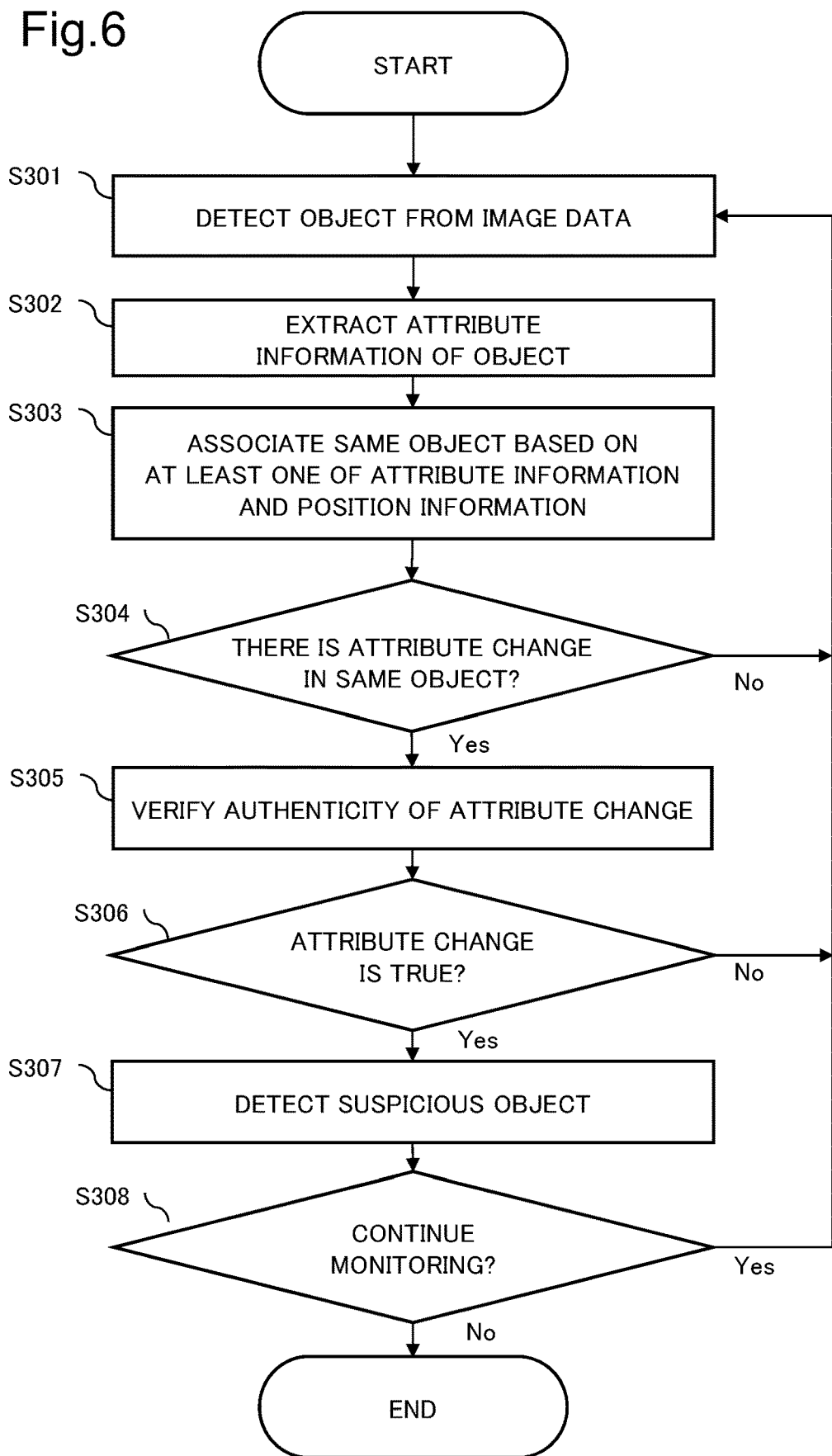
FIG. 6 is a flowchart illustrating an operation flow of the monitoring device according to Example embodiment 3.

An operation flow of the monitoring device 300 according to Example embodiment 3 will be described with reference to FIG. 6. FIG. 6 is a flowchart illustrating an operation flow of the monitoring device 300.

Steps S301 to S304 illustrated in FIG. 6 are the same as steps S201 to S204 of the operation flow of the monitoring device 200 described in Example embodiment 2 above. Here, an operation flow from step S304 will be described.

In step S304, the attribute change detection unit 250 determines whether the attribute of the same person changes between pieces of time-series image data.

When the attribute of the same person changes between pieces of time-series image data (Yes in S304), the attribute change verification unit 290 verifies the authenticity of the attribute change detected by the attribute change detection unit 250 (S305).

If the attribute change is false (No in S306), the attribute change verification unit 290 filters out the attribute change detection result of the object. Then, the operation flow returns to step S301.

On the other hand, if the attribute change is true (Yes in S306), the suspicious object detection unit 210 detects the person whose attribute has changed as a suspicious object (S307).

If the monitoring of the object (person) by the monitoring device 300 is continued (Yes in S308), the operation flow returns to step S301. If the monitoring of the object (person) by the monitoring device 300 is not continued (No in S308), the operation flow ends.

The monitoring device 300 may be controlled to continue monitoring only in a certain time zone by a timer, for example.

Effects of Present Example Embodiment

According to the configuration of the present example embodiment, the association unit 240 associates the same objects with each other among multiple objects detected from time-series image data. The attribute change detection unit 250 detects a change in the attribute of at least one of the same object and accessory from the time-series image data. The suspicious object detection unit 210 detects a suspicious object on the basis of a change in attribute. Hence, it is possible to detect a suspicious object that cannot be determined from the behavior of the object.

Further, the attribute change verification unit 290 verifies the authenticity of the attribute change of the object detected by the attribute change detection unit 250. The attribute change verification unit 290 filters out a false attribute change. The suspicious object detection unit 210 detects the same object as a suspicious object if the attribute change is true, and does not detect the same object as a suspicious object if the attribute change is false. For this reason, the suspicious object can be more accurately detected based on the true attribute change.

Example Embodiment 4

In Example embodiment 4, a configuration for analyzing a context associated with an attribute change will be described. In Example embodiment 4, an associated context means at least one of an environment that affects the attribute change and an event that occurs in association with the attribute change. In the following description, a case where the object is a person will be mainly described, but the object may be an object other than a person such as a vehicle.

(Monitoring Device 400)

Figure 7:
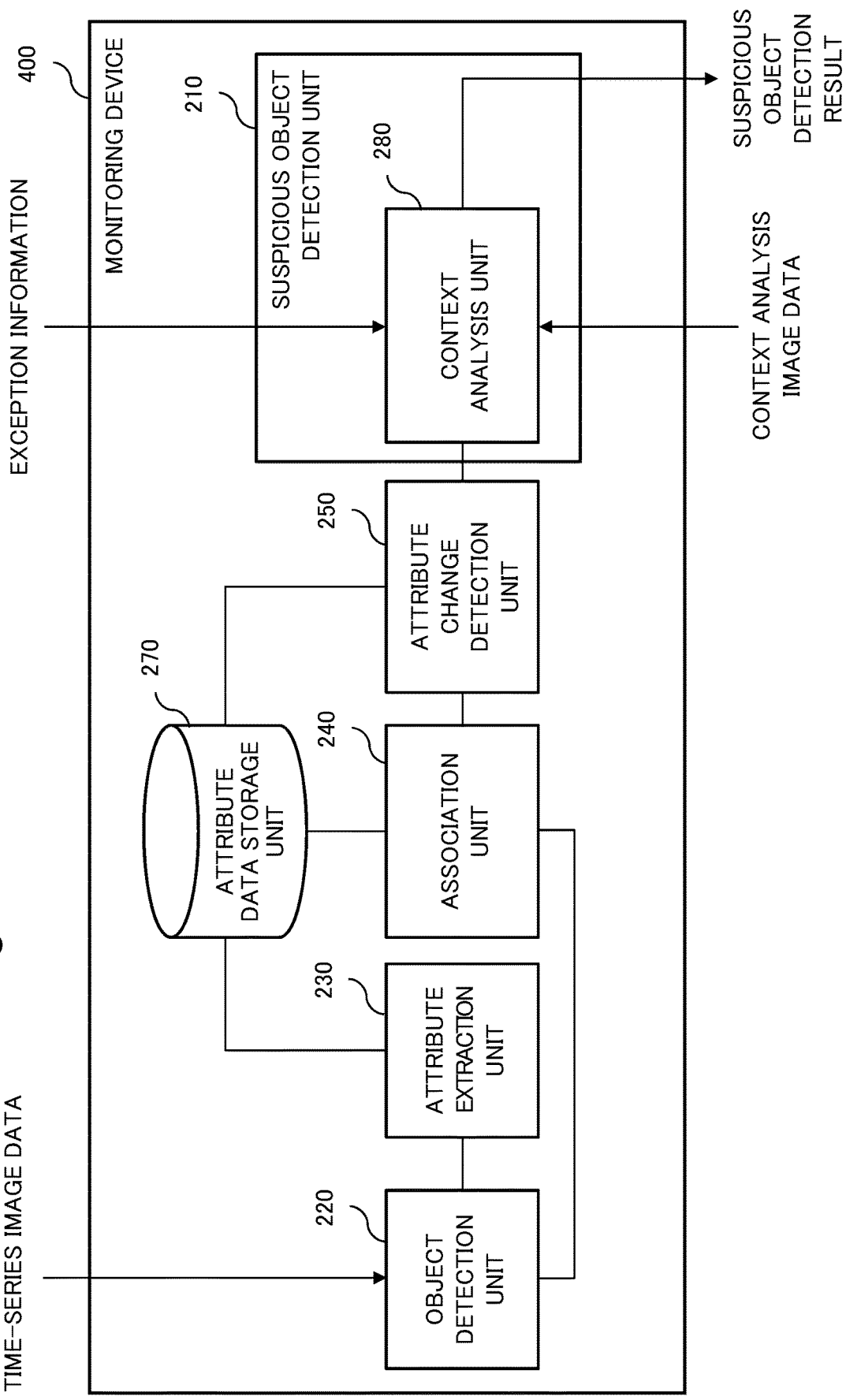
FIG. 7 is a block diagram illustrating a configuration of a monitoring device according to Example embodiment 4.

FIG. 7 is a block diagram illustrating a configuration of a monitoring device 400 according to Example embodiment 4. As illustrated in FIG. 7, the monitoring device 400 includes a suspicious object detection unit 210, an object detection unit 220, an attribute extraction unit 230, an association unit 240, an attribute change detection unit 250, and an attribute data storage unit 270. Additionally, in the monitoring device 400, the suspicious object detection unit 210 includes a context analysis unit 280.

The configuration of the monitoring device 400 according to Example embodiment 4 is obtained by adding the context analysis unit 280 to the configuration of the monitoring device 200 according to Example embodiment 2 above. In Example embodiment 4, only the context analysis unit 280 will be described below.

(Context Analysis Unit 280)

The context analysis unit 280 analyzes the context associated with an attribute change of an object. The context analysis unit 280 is an example of context analysis means.

Specifically, the context analysis unit 280 receives, from the attribute change detection unit 250, an attribute change detection result of a person or an accessory (one example of object) and information (e.g., frame number of image data) for specifying the image data in which the attribute change is detected.

The context analysis unit 280 specifies the image data in which the attribute change is detected among pieces of time-series image data by using the information (e.g., frame number of image data) for specifying the image data in which the attribute change is detected. Then, the context analysis unit 280 acquires, from the time-series image data, one or multiple pieces of image data (hereinafter referred to as context analysis image data) corresponding to image data in which the attribute change is detected and image frames within a predetermined time range before and after the image data.

The context analysis unit 280 analyzes the acquired context analysis image data to specify the context associated with the attribute change. Specifically, the context analysis unit 280 specifies at least one of an environment (temperature, time zone, weather, humidity, brightness, human density, and the like) that affects the attribute change and an event (person's behavior, incident, accident, traffic condition, and the like) that has occurred in association with the attribute change.

Alternatively, the context analysis unit 280 may acquire information such as the temperature, weather, humidity, brightness, and human density using a sensor or the like other than the imaging sensor. Alternatively, the context analysis unit 280 may also acquire information such as an incident, an accident, and a traffic situation from another external information source.

The context analysis unit 280 searches for exception information related to a combination of an attribute change and an associated context. Exception information may be stored in advance in a server on a network connected to the monitoring device 400.

Exception information is information describing a specific attribute change that is not suspicious only in a specific context. For example, when moving from the outside where it is cold to a warm room, a person takes off his/her jacket and hat. In the above example, the movement of the person from the outside to the room is a specific event, and the change in the clothing of the person is a specific attribute change.

Exception information associates information of a specific context with information of a specific attribute change. Exception information is preferably present for each type of object and for each type of accessory. Exception information may be stored in advance in an exception information storage unit (not illustrated).

In one modification, exception information may be generated by the context analysis unit 280. Specifically, in a case where a specific attribute change is frequently (e.g., equal to or more than threshold number of times) detected by the attribute change detection unit 250 in a specific context (at least one of specific environment and specific event), the context analysis unit 280 generates exception information in which the specific attribute change is associated with the specific context. The context analysis unit 280 may transmit the generated exception information to a server that stores exception information, or may store the generated exception information in an exception information storage unit (not illustrated).

When exception information, related to the combination of the attribute change and the associated context, exists, the context analysis unit 280 filters out the attribute change detection result of the object.

That is, the suspicious object detection unit 210 detects the same object as a suspicious object in a case where the combination of the attribute change and the associated context does not correspond to a specific exception, and does not detect the same object as a suspicious object in a case where the combination of the attribute change and the associated context corresponds to a specific exception.

Note that the suspicious object detection unit 210 according to Example embodiment 4 may restrict filtering out the attribute change detection result by the context analysis unit 280 in a special situation such as a case where a crime occurs. This is because special situations may occur even in situations corresponding to specific exceptions.

(Specific Exception)

FIG. 8 is a diagram illustrating an example of the exception information described above. The following Examples 1 to 3 correspond to No. 1 to No. 3 illustrated in FIG. 8. The following Examples 1 to 3 will be described in order.

Example 1

In a locker room at work, a person changes into a uniform. In this example, the change in clothing corresponds to a specific attribute change in a specific exception, and the locker room corresponds to a specific environment in a specific exception. On the other hand, at the entrance of a residence building, the clothing (attribute information) of a person is usually not likely to change to a uniform of a mail delivery person or a home delivery agent. Hence, the combination of the attribute change (change in clothing) of the accessory and the environment (entrance of residence building) in the latter example does not correspond to a specific exception.

Example 2

In a railway station, since luggage is loaded into a locker, the number of luggage (accessory) of a person changes. When luggage (one example of accessory) carried on the back of a person is held by hand, the position of the luggage changes. In these examples, a change in the number or location of a person's luggage corresponds to a specific attribute change in a specific exception, and loading of luggage or change in the way of carrying the luggage corresponds to a specific event in a specific exception.

Example 3

When moving from the outside where it is cold to a warm room, a person takes off his/her coat and hat. In the above example, the change in the clothing of the person is a specific attribute change in a specific exception, and the movement of the person from the outside to the room is a specific event in a specific exception. In the present example, it is preferable that exception information further includes information regarding an environment that affects the specific attribute change, such as information on the outside temperature, humidity, and season. As a result, the context analysis unit 280 can more accurately determine the specific exception on the basis of the exception information.

(Operation Flow of Monitoring Device 300)

Figure 9:
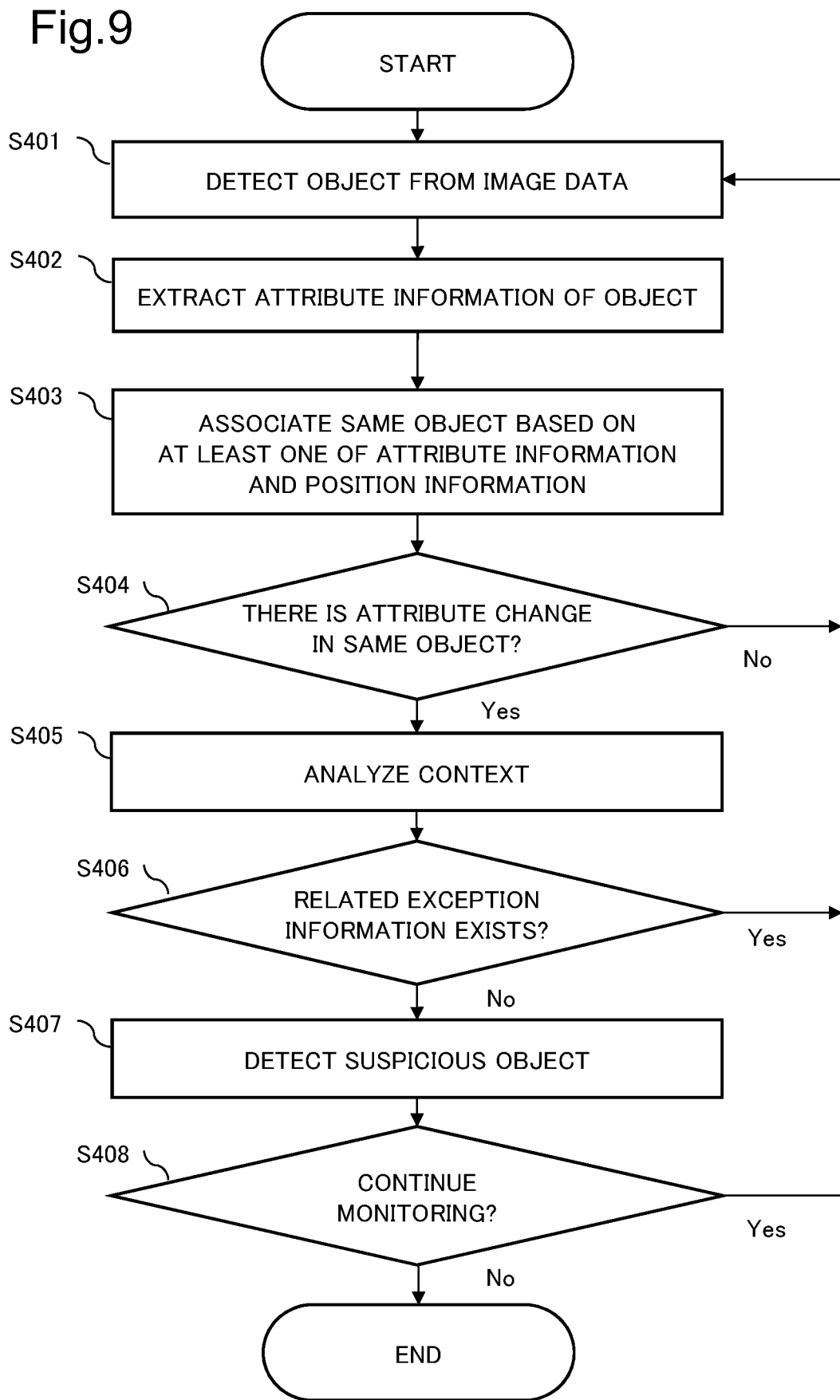
FIG. 9 is a flowchart illustrating an operation flow of the monitoring device according to Example embodiment 4.

An operation flow of the monitoring device 400 according to Example embodiment 4 will be described with reference to FIG. 9. FIG. 9 is a flowchart illustrating an operation flow of the monitoring device 400. In the operation flow of the monitoring device 400 illustrated in FIG. 9, the flow from step S401 to step S404 is the same as the flow from step S201 to step S204 of the operation flow of the monitoring device 200 illustrated in FIG. 4 described in Example embodiment 2 above.

First, the object detection unit 220 acquires time-series image data. In Example embodiment 4, too, the object detection unit 220 receives image frames (hereinafter referred to as image data) of moving image data captured by the monitoring camera one by one in real time. The object detection unit 220 detects objects (person and accessory in this example) from the received single piece of image data (S401).

The object detection unit 220 transmits image data of a region of a person and an accessory in the image data to the attribute extraction unit 230 together with information (hereinafter referred to as person label and accessory label) for identifying the region of the person and the accessory. The object detection unit 220 transmits position information of the person detected from the image data to the association unit 240 together with the person label.

The attribute extraction unit 230 receives the image data of the region of the person and the accessory together with the person label and the accessory label from the object detection unit 220. The attribute extraction unit 230 extracts attribute information of the person and attribute information of the accessory from the image data of the region of the person and the region of the accessory (S402). Hereinafter, when simply described as attribute information of a person, attribute information of the accessory is also included.

The attribute extraction unit 230 stores the extracted attribute information of the person (including attribute information of accessory) in association with the person label in the attribute data storage unit 270 as attribute data.

The association unit 240 receives position information of the person together with the person label from the object detection unit 220.

The association unit 240 associates the same person on the basis of the position information of the person received from the object detection unit 220 (S403).

The association unit 240 generates a group of person labels related to the same person. The association unit 240 transmits information (e.g., multiple person labels associated with one group ID) indicating a group of the same persons to the attribute change detection unit 250.

The attribute change detection unit 250 receives the information indicating the group of the same persons from the association unit 240.

The attribute change detection unit 250 acquires multiple pieces of attribute data associated to multiple person labels related to the same person in the attribute data storage unit 270. Then, the attribute change detection unit 250 determines whether the pieces of attribute information included in the multiple pieces of acquired attribute data match (S404).

In step S404, the association unit 240 can use the similarity or distance between pieces of attribute information, for example, as a scale for determination in step S404.

If the pieces of attribute information of the person associated to the multiple person labels related to the same person match, the attribute change detection unit 250 determines that the attribute of the same person has not changed between pieces of time-series image data (No in S404). In this case, the operation flow returns to step S401.

On the other hand, if at least one of the elements of the attribute information of the person associated to the multiple person labels related to the same person does not match, the attribute change detection unit 250 determines that the attribute of the same person has changed between pieces of time-series image data (Yes in S404). That is, the attribute change detection unit 250 detects an attribute change.

In Example embodiment 4, the attribute change detection unit 250 transmits the attribute change detection result to the context analysis unit 280 together with information (e.g., frame number of image data) for specifying the image data in which the attribute change is detected.

The context analysis unit 280 receives, from the attribute change detection unit 250, the attribute change detection result and information (e.g., frame number of image data) for specifying the image data in which the attribute change is detected.

The context analysis unit 280 acquires context analysis image data related to the image data in which the attribute change is detected from the time-series image data. Then, the context analysis unit 280 analyzes the context associated with the attribute change using the context analysis image data (S405).

Specifically, in step S405, the context analysis unit 280 specifies at least one of an environment (temperature, humidity, brightness, time zone, weather, human density, and the like) that affects the attribute change and an event (person's behavior, incident, accident, traffic condition, and the like) that has occurred in association with the attribute change.

The context analysis unit 280 searches for exception information related to the combination of the detected attribute change and the associated context (S406).

If there is exception information related to the combination of the detected attribute change and the associated context (Yes in S406), the context analysis unit 280 filters out the attribute change detection result of the object. Then, the operation flow returns to step S401.

On the other hand, if there is no exception information related to the combination of the attribute change and the associated context (No in S406), the suspicious object detection unit 210 detects the person whose attribute has changed as a suspicious object (S407).

If the monitoring of the object (person) by the monitoring device 400 is continued (Yes in S408), the operation flow returns to step S401. If the monitoring of the object (person) by the monitoring device 400 is not continued (No in S408), the operation flow ends. The monitoring device 400 may be controlled to continue monitoring only in a certain time zone by a timer, for example.

Effects of Present Example Embodiment

According to the configuration of Example embodiment 4, the association unit 240 associates the same objects with each other among multiple objects detected from time-series image data on the basis of at least one of attribute information and position information of the multiple objects, and the attribute change detection unit 250 detects an attribute change of the same object between pieces of the time-series image data. Hence, it is possible to curb erroneous detection of an attribute change of a suspicious object.

Further, the context analysis unit 280 analyzes the context associated with the attribute change of the object. Of the attribute changes detected by the attribute change detection unit 250, the context analysis unit 280 filters out the attribute change related to a specific exception on the basis of the analysis result of the context. As a result, it is possible to prevent an object that is not suspicious from being erroneously detected.

(Modification)

The configurations described in Example embodiments 3 and 4 above can be combined. That is, the suspicious object detection unit 210 may include both the attribute change verification unit 290 and the context analysis unit 280.

In the present modification, the attribute change verification unit 290 verifies the authenticity of an attribute change detected by the attribute change detection unit 250, and filters out (that is, removes) a false attribute change. When the combination of the (true) attribute change and the associated context corresponds to a specific exception, the context analysis unit 280 further filters out the attribute change.

According to the configuration of the present modification, both a false attribute change and an attribute change corresponding to a specific exception are filtered out. For this reason, it is possible to more reliably prevent an object that is not suspicious from being erroneously detected.

Example Embodiment 5

Example embodiment 5 will be described with reference to FIG. 10.

Figure 10:
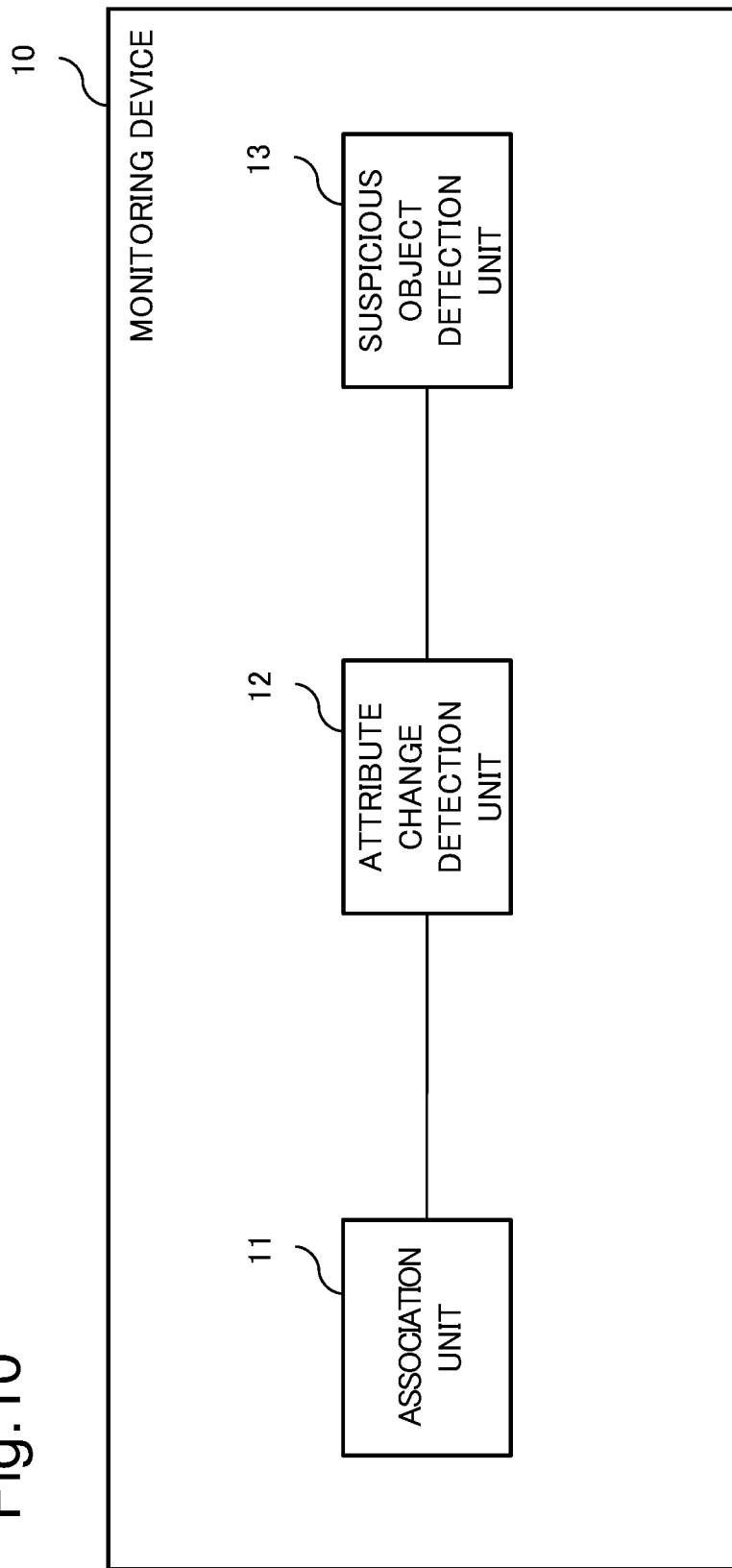
FIG. 10 is a block diagram illustrating a configuration of a monitoring device according to Example embodiment 5.

FIG. 10 is a block diagram illustrating a configuration of a monitoring device 10 according to Example embodiment 5. As illustrated in FIG. 10, the monitoring device 10 includes an association unit 11, an attribute change detection unit 12, and a suspicious object detection unit 13.

The association unit 11 associates the same object among multiple objects detected from time-series image data.

The attribute change detection unit 12 detects a change in the attribute of at least one of the same object and its accessory from the time-series image data.

The suspicious object detection unit 13 detects a suspicious object on the basis of a change in attribute.

With the above configuration, the monitoring device 10 according to Example embodiment 5 can detect a change in attribute between the times when the object is detected for the objects associated as the same object, and thus can detect a suspicious object that cannot be determined from the behavior of the object.

Example Embodiment 6

Example embodiment 6 will be described below with reference to FIG. 11.
(Hardware Configuration)

Each component of the monitoring devices 10, 100, 200, 300, and 400 described in Example embodiments 1 to 5 above represents a functional unit block. Some or all of these components are implemented by an information processing apparatus 900 as illustrated in FIG. 11, for example. FIG. 11 is a block diagram illustrating an example of a hardware configuration of the information processing apparatus 900 according to Example embodiment 6.

Figure 11:
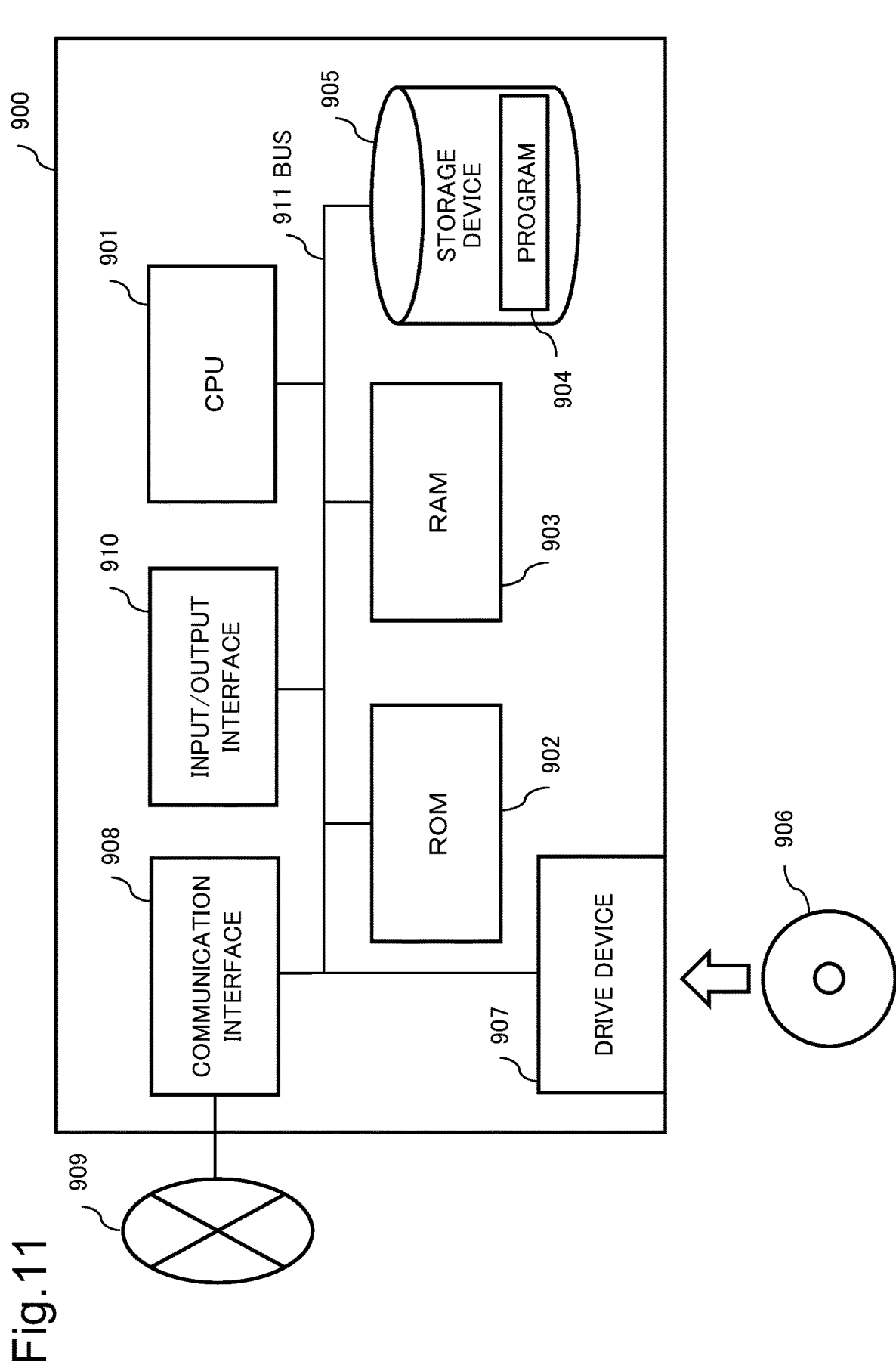
FIG. 11 is a diagram illustrating a hardware configuration according to Example embodiment 6.

As illustrated in FIG. 11, the information processing apparatus 900 includes the following configuration as an example.

Central Processing Unit (CPU) 901
Read Only Memory (ROM) 902
Random Access Memory (RAM) 903
Program 904 loaded into RAM 903

Storage device 905 storing program 904
Drive device 907 that reads and writes recording medium 906
Communication interface 908 connected to communication network 909
Input/output interface 910 for inputting and outputting data
Bus 911 connecting each component The components of the monitoring devices 10, 100, 200, 300, and 400 described in Example embodiments 1 to 5 above are implemented by the CPU 901 reading and executing the program 904 that implements these functions. The program 904 for implementing the function of each component is stored in the storage device 905 or the ROM 902 in advance, for example, and the CPU 901 loads the program into the RAM 903 and executes the program as necessary. The program 904 may be supplied to the CPU 901 through the communication network 909, or may be stored in advance in the recording medium 906, and the drive device 907 may read the program and supply the program to the CPU 901.

Effects of Present Example Embodiment

According to the configuration of the present example embodiment, the monitoring devices 10, 100, 200, 300, and 400 described in Example embodiments 1 to 5 above are implemented as hardware. Hence, effects similar to the effects described in Example embodiments 1 to 5 above can be obtained.

While the disclosure has been particularly shown and described with reference to exemplary embodiments thereof, the disclosure is not limited to these embodiments. It will be understood by those of ordinary skill in the art that various changes in form and details may be made therein without departing from the spirit and scope of the disclosure as defined by the claims.

INDUSTRIAL APPLICABILITY

The disclosure can be used for detecting a suspicious person in an important facility such as an airport or a public facility. The disclosure may also be used for control (e.g., temperature adjustment of an air conditioner, and the like) of a device using a detection result of an attribute change of an object.

This application is based upon and claims the benefit of priority from Japanese patent application No. 2019-061223, filed on Mar. 27, 2019, the disclosure of which is incorporated herein in its entirety by reference.

REFERENCE SIGNS LIST 100 monitoring device
110 association unit
120 attribute change detection unit
130 suspicious object detection unit
200 monitoring device
210 suspicious object detection unit
220 object detection unit
230 attribute extraction unit
240 association unit
250 attribute change detection unit
280 context analysis unit
290 attribute change verification unit
300 monitoring device
400 monitoring device

The invention claimed is:

1. A monitoring device comprising:
a memory storing instructions; and
at least one processor coupled to the memory and configured to execute the instructions to perform operations to:
associate a same object among multiple objects detected from time-series image data;
detect an attribute change of at least one of the same object and an accessory of the same object from the time-series image data;
specify a context in image data in which the attribute change is detected; and
detect the same object as a suspicious object when a combination of the detected attribute change and the specified context is not included in exception information, wherein
the exception information indicates an attribute change that is not suspicious in a context, and
the exception information includes information associating a context indicating a locker room with an attribute change indicating change in clothing.

2. The monitoring device according to claim 1, wherein the at least one processor further performs the operations to:
when the combination of the detected attribute change and the specified context is included in the exception information, do not detect the same object as a suspicious object.

3. The monitoring device according to claim 2, wherein the at least one processor further performs the operations to:
when the combination of the detected attribute change and the specified context is included in the exception information, remove a detection result of the attribute change.

4. The monitoring device according to claim 1, wherein the exception information indicates the information associating a context with an attribute change for each type of object and for each type of accessory.

5. The monitoring device according to claim 1, wherein the context indicates at least one of an environment affecting an attribute change and an event that occurred in association with an attribute change.

6. The monitoring device according to claim 1, wherein the at least one processor further performs the operations to:
when a specific attribute change in a specific context is detected more than a threshold number of times, generate exception information in which the specific attribute change is associated with the specific context.

7. The monitoring device according to claim 1, wherein the exception information includes information associating a context indicating loading of luggage or change in the way of carrying the luggage with an attribute change indicating a change in a number or location of a person's luggage.

8. The monitoring device according to claim 1, wherein the exception information includes information associating a context indicating movement of a person between outside and a room with an attribute change indicating a change in clothing.

9. A monitoring method performed by a computer and comprising:
associating a same object among multiple objects detected from time-series image data;
detecting an attribute change of at least one of the same object and an accessory of the same object from the time-series image data;
specifying a context in image data in which the attribute change is detected; and detecting the same object as a suspicious object when a combination of the detected attribute change and the specified context is not included in exception information, wherein the exception information indicates an attribute change that is not suspicious in a context, and the exception information includes information associating a context indicating a locker room with an attribute change indicating change in clothing.

10. The monitoring method according to claim 9, further comprising:

when the combination of the detected attribute change and the specified context is included in the exception information, not detecting the same object as a suspicious object.

11. The monitoring method according to claim 10, further comprising:

when the combination of the detected attribute change and the specified context is included in the exception information, removing a detection result of the attribute change.

12. The monitoring method according to claim 9, wherein the exception information indicates information associating a context with an attribute change for each type of object and for each type of accessory.

13. The monitoring method according to claim 9, wherein the context indicates at least one of an environment affecting an attribute change and an event occurred in association with an attribute change.

14. The monitoring method according to claim 9, further comprising:

when a specific attribute change in a specific context is detected more than a threshold number of times, generating exception information in which the specific attribute change is associated with the specific context.

15. The monitoring method according to claim 9, wherein the exception information includes information associating a context indicating loading of luggage or change in the way of carrying the luggage with an attribute change indicating a change in a number or location of a person's luggage.

16. The monitoring method according to claim 9, wherein the exception information includes information associating a context indicating a movement of a person between outside and a room with an attribute change indicating change in clothing.

17. A non-transitory computer-readable recording medium storing a program for causing a computer to execute processing comprising:

associating a same object among multiple objects detected from time-series image data;

detecting an attribute change of at least one of the same object and an accessory of the same object from the time-series image data;

specifying a context in image data in which the attribute change is detected; and detecting the same object as a suspicious object when a combination of the detected attribute change and the specified context is not included in exception information, wherein the exception information indicates an attribute change that is not suspicious in a context, and the exception information includes information associating a context indicating a locker room with an attribute change indicating change in clothing.

18. The non-transitory computer-readable recording medium according to claim 17, wherein the processing further comprises:

when the combination of the detected attribute change and the specified context is included in the exception information, not detecting the same object as a suspicious object.

* * * * *